Feb. 10, 1959     E. E. GIBBENS     2,873,302
RADIATION INTENSITY DETECTOR
Filed May 14, 1956
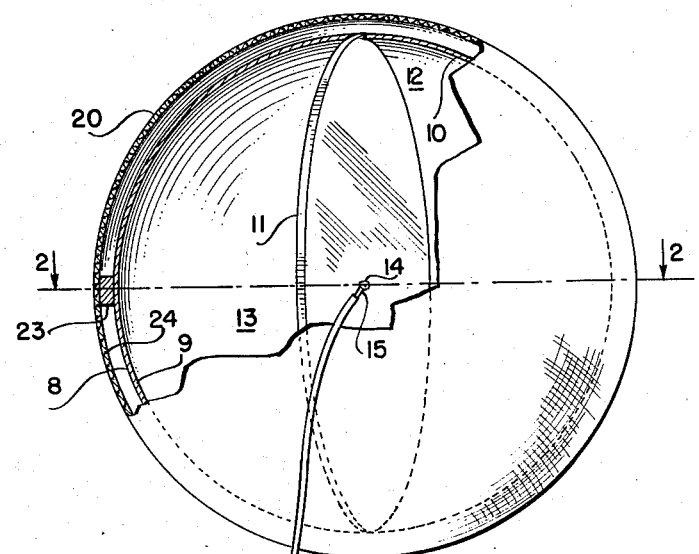
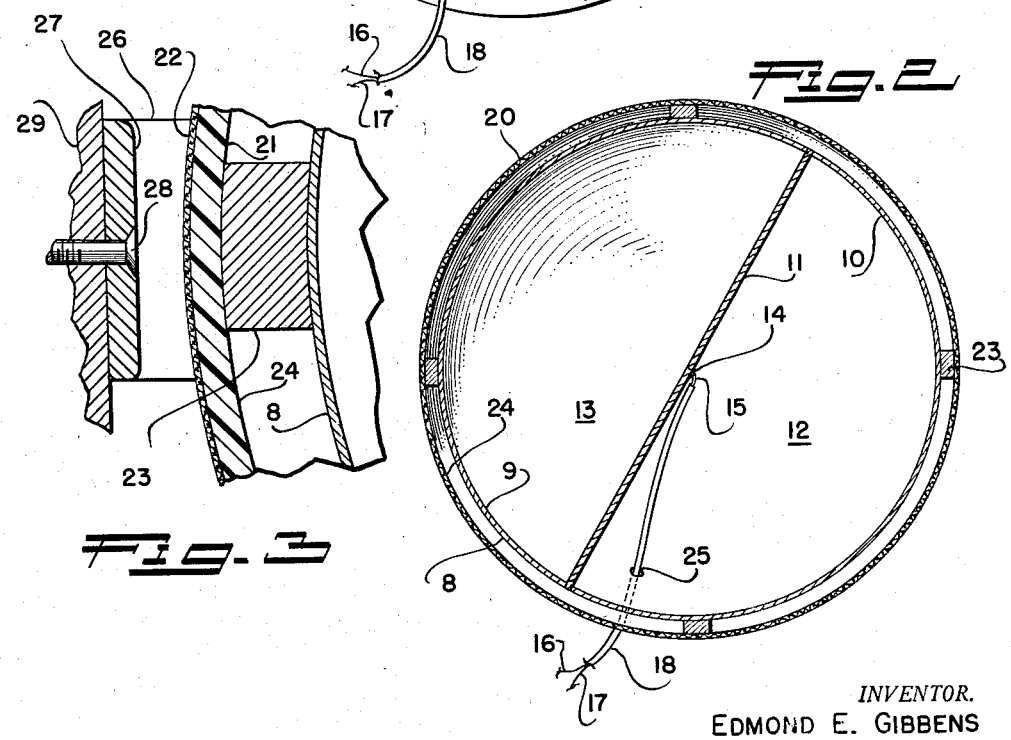
INVENTOR.
EDMOND E. GIBBENS
BY
                Agent

United States Patent Office 2,873,302
Patented Feb. 10, 1959

2,873,302

RADIATION INTENSITY DETECTOR

Edmond E. Gibbens, Hollywood, Calif., assignor to Lockheed Aircraft Corporation, Burbank, Calif.

Application May 14, 1956, Serial No. 584,612

5 Claims. (Cl. 136—4)

This invention relates to pyrometers and more particularly to a radiation intensity detector which is sensitive to heat radiations from all directions independent of air velocity about the detector.

Pyrometers and heat detectors have been employed in the past to sense and determine the intensity of high temperatures. Particularly, in the aircraft industry it has become exceedingly important to determine and measure the intensity of heat present in small compartments of an aircraft undergoing test operations. It is important that the total intensity of heat present in the compartment be measured rather than a sampling of heat radiation from only one direction. In addition, it has been found desirable to provide a means for negating or obviating the effects of convective cooling since heat detection may often occur while the aircraft is undergoing high speed flight and air velocity is present.

Difficulties have been encountered when employing a conventional heat detector in such testing operations which are due in part to the fact that their operation is sensitive to radiations from only a single direction and/or their reliability is influenced by convective currents surrounding the detector. Rugged test operations naturally would preclude the use of conventional glass thermometers and, therefore, it is desirable to employ a detector having as few parts as possible and able to withstand a variety of environmental conditions.

These difficulties have been obviated by the present invention in which there is provided a spherical container interiorly divided into two parts by a disk. The container functions to intercept radiated heat waves. Means are provided and arranged near the center of the disk to sense and measure heat radiations from the interior walls of the container and heat conducted through the metal of the container and through the disk. The container is enclosed within a protective housing so that convective cooling will not interfere with a true measurement of radiated heat. This feature prevents the operation of the detector from being affected by the cooler temperature of air currents which pass about the periphery of the detector.

It is an object of the present invention to provide a temperature responsive device which maintains its heat capacity at a minimum so that the detector will be readily responsive to variations and changes of temperature.

It is another object of the present invention to provide a novel heat intensity detector which is not affected or influenced by convective cooling currents surrounding the detector.

It is still a further object to provide a novel detector which is sensitive to radiant heat energy from all directions regardless of the position of the detector.

These and other objects will be more readily described and understood with reference to the accompanying drawings wherein:

Figure 1 is an elevational view of a heat radiation intensity detector showing a fragmentary portion thereof in accordance with the present invention;

Figure 2 is a cross-sectional view taken along line 2—2 of Figure 1 showing the spaced relationship between the container and the protective housing; and Figure 3 is a fragmentary view showing the container and protective housing in section and including a support member.

Referring to the figures, a heat radiation intensity detector is shown in accordance with the present invention which comprises a hollow spherical container 8 having a pair of shells 9 and 10 of high thermally conductive metal such as copper having a partition means or a disk 11 of similar metal which divides the interior of the container into a pair of chambers 12 and 13. The disk is affixed to the container by silver soldering. Rigidly secured to the center of disk 11 at a thermoelectric junction 14 is a thermocouple 15 formed by leads 16 and 17 being of metals or alloys thermo-electrically dissimilar to each other. Junction 14 is located equidistant from the periphery of the disk. One of the leads may, conveniently, be of iron alloy and the other of an alloy composed of constatan; these alloys having high thermo-electric power in combination. The diameter of the leads should be very small, preferably of the order of .010 inch.

Thermocouple 15 is secured to the center of the disk by suitable adhesive means such as silver soldering. Leads 16 and 17 extend through chamber 12 and are shielded by means of a suitable covering 18.

The entire copper container is enclosed within a second container or protective plastic sphere 20 having the characteristic of high thermal transparency and low thermal conductivity such as Plexiglas 21 covered with a single layer of Fiberglas 22. The Fiberglas layer is attached to the Plexiglas by applying a lacquer coating to the Plexiglas and pressing the Fiberglas in place. When the lacquer dries, a firm bond exists between the Fiberglas and the Plexiglas. The container and protective sphere 20 are separated from each other by means of a plurality of spacers such as spacer 23 composed of metal, plastic or wooden materials for example. The spacers are affixed to an inner wall 24 of sphere 20 and the periphery of container 8 by suitable cementing methods employing commercially available "duco" cement or paste. Leads 17 and 18 extend through a hole 25 of the container and the plastic sphere exteriorly of the detector so that indicating and recording equipments may be attached. Plastic sphere 20 serves to protect and isolate container 8 so that convective cooling caused by surrounding air velocities will not interfere with the measurement of radiated heat.

Figure 3 illustrates an alternate means for supporting the detector rather than employing the leads 16 and 17 to support the detector which comprises a support 26, composed of either metallic or non-metallic materials, having a flange 27 through which a screw 28 passes into a structural member 29. The shape of the support may be annular, U-shaped or on the order of an angle iron. The support may be attached to the periphery of the protective sphere 20 by such means as cementing with "duco" cement or paste. Although attachment may be made anywhere on the periphery of the sphere, best support will be given if attachment is located adjacent a spacer such as spacer 23.

In actual operation the detector may be supported by the thermocouple leads 16 and 17 or by support 26 as shown in Figure 3 in an area to receive heat radiation. Heat radiations are passed through the sphere 20 and are intercepted by the copper container 8 from all directions. The generated heat is transferred to the center of the disk 11 at the thermo-electric junction 14 by means of convective heat radiations through chambers 12 and 13 and by means of a thermo-conductive path through the copper container and the copper disk 11.

The presence of temperature at junction 14 generates an electromotive force by means of thermocouple 15, commensurate to the degree of temperature. Leads 16 and 17 conduct the generated thermo-electric generated signal to remotely located recording instruments (not shown).

Having described only typical forms of the invention, I do not wish to be limited to the specific details herein set forth, but wish to reserve to myself any variations or modifications that may appear to those skilled in the art and fall within the scope of the following claims.

I claim:

1. In a thermal intensity detector the combination comprising, a hollow spherical container being a good heat conductor, partition means dividing the hollow of the container into two equal hemispheres and arranged to collect heat from the container including radiant heat generated interiorly of the spherical container, and temperature responsive means associated with the partition means substantially equidistant from all points of the interior surface of the spherical container in such a manner that it responds to the resultant effect of partition means temperature.

2. In a thermal radiation intensity detector, the combination comprising, a pair of hollow spherical containers of different sizes concentrically arranged in spaced relationship so that the smallest container resides within the larger, the smallest of the containers being a good heat conductor, partition means dividing the hollow of the smaller container into two equal hemispheres and having its periphery attached to the container, and thermo-electric means substantially equidistant from all points of the interior surface of the spherical container carried by the partition means responsive to the temperature of the partition means.

3. In a thermal radiation intensity detector, the combination comprising, a first spherical hollow container, a second spherical hollow container of heat conductive material within the first hollow container and being concentric therewith, means for maintaining the first hollow container in spaced relationship with the second hollow container, partition means carried inside the second hollow container and dividing the same into a pair of equal chambers adaptable to receive radiated heat from the interior surface of the second spherical container, and thermo-responsive means coupled to the partition means at a point substantially equidistant from all points of the interior surface of the second spherical container for generating an electromotive force commensurate to the temperature of the partition means.

4. In a thermal radiation intensity detector, the combination comprising, a first spherical hollow container having the characteristic of high heat transparency and low heat conduction, a second spherical hollow container of heat conductive material enclosed within the first hollow container and being concentric therewith in spaced relation thereto, partition means carried within the second hollow container dividing the same into a pair of equal chambers to pass radiant heat from the interior surface of the second spherical container to the partition means, and thermal responsive means coupled to the partition means for generating an electromotive force commensurate to the temperature of the partition means.

5. In a thermal radiation intensity detector, the combination comprising, a first spherical hollow container having high thermal transparency and low thermal conduction characteristics, a second spherical hollow container of heat conductive material enclosed within the first hollow container, means attached to the inner surface of the first hollow container and the outer periphery of the second hollow container so that the containers are maintained in a concentric spaced relationship, a disk of high heat conducting ability attached to the inner surface of the second hollow container to receive radiant heat from the total inner surface of the second container, a pair of equal chambers within the second hollow container separated by the disk through which radiant heat travels from the inner surface of the second container to opposite sides of the disk, and thermal responsive means coupled to the center of the disk substantially equidistant from all points of the inner surface of the second container for generating an electromotive force commensurate to the temperature of the disk.

References Cited in the file of this patent

UNITED STATES PATENTS

| | | |
|---|---|---|
| 2,291,448 | Bragg | July 28, 1942 |
| 2,399,640 | Kettering | May 7, 1946 |
| 2,414,370 | Floyd | Jan. 14, 1947 |
| 2,496,807 | Moffatt | Feb. 7, 1950 |
| 2,496,835 | Ward | Feb. 7, 1950 |
| 2,627,530 | Fastie | Feb. 3, 1953 |
| 2,677,711 | Ray | May 4, 1954 |

OTHER REFERENCES

Power Plant Engineering, August 1944, pages 94–96.